United States Patent Office 3,077,467
Patented Feb. 12, 1963

3,077,467
POLYMERIZATION PROCESS AND COPOLYMERS OF ALKYLENE OXIDES WITH BUTADIENE AND METHYL METHACRYLATE
Arthur E. Gurgiolo, Lake Jackson, Tex., assignor to The Dow Chemical Company, Midland, Mich., a corporation of Delaware
No Drawing. Filed July 3, 1958, Ser. No. 746,331
13 Claims. (Cl. 260—94.2)

This invention relates to new copolymeric compositions of lower alkylene oxides and vinyl compounds and to methods for their preparation.

The novel polymeric compositions are copolymers of a lower alkylene oxide and a vinylidene compound, such as vinylidene chloride, methyl methacrylate, butadiene, and mixtures thereof, containing in combined form from 5 to 95 weight percent of the alkylene oxide and the remainder the vinylidene compound. These copolymers are white to brownish solid materials that have at least one and usually more of a variety of uses including the preparation of moldings, films, fibers, and in coating applications. They generally provide high strength fabricated articles that are possessed of good dielectric characteristics. They have an average molecular weight in excess of 100,000, softening points generally above 60° C. and frequently over 120° C., which is considerably higher than obtained by polymerization of alkylene oxides or copolymerization of different alkylene oxides. They are insoluble in and resistant to water and aqueous acids and alkalis, and some are insoluble in aromatic hydrocarbons and most oxygenated organic solvents. Copolymers containing from 80 to 90 weight percent of propylene oxide and from 10 to 20 weight percent of the selected vinylidene compounds are especially useful in film form.

The term "lower alkylene oxide" as used herein means substituted and unsubstituted alkylene oxides having not more than 4 carbon atoms. Examples of these lower alkylene oxides are ethylene oxide, propylene oxide, chloropropylene oxide, isobutylene oxide, and 1,2 - butylene oxide and the isomeric 2,3-butylene oxide.

The solid copolymers of the invention may be made by the copolymerization of the alkylene oxide and the selected vinylidene compounds in the presence of a ferric chloride-propylene oxide complex catalyst. This catalyst appears to be a mixture of complex salts containing ferric chloride and propylene oxide in definite molecular ratios. Analysis and conduction-etric studies have tentatively identified the complexes as probably mixtures of $2FeCl_2 \cdot C_3H_6O$, $FeCl_3 \cdot C_3H_6O$, and $FeCl_3 \cdot 3C_3H_6O$ The catalyst is made by adding a limited amount of propylene oxide very gradually with agitation to a body of anhydrous ferric chloride until the vigorous exothermic reaction ceases which generally occurs when 2 to 3 moles of propylene oxide have been added per mole of ferric chloride. Further details in the preparation and purification of the catalyst are given in U.S. Patent No. 2,706,181.

In the copolymerization, the monomers and the catalyst may be simply mixed together and charged into a closed vessel and heated until the polymerization is complete. It is usually beneficial for the reaction mass to be agitated during the polymerization. The amount of catalyst that is employed is generally from 1 to 6 percent by weight, based on the weight of the reacting monomers. Preferably, an amount of catalyst of about 4 weight percent is utilized. The employment of the preferred amount of catalyst ordinarily secures optimum rates of reaction and more complete conversions of the monomers to solid copolymers.

The copolymerization may be carried out within the temperature range of about 30° to 150° C. At the lower temperatures higher yield of the solid copolymers may be realized but the polymerization time is generally longer and may often be 200 hours or more. At the high temperatures, the rate of reaction is relatively rapid and a suitable point for the termination of the reaction may be reached in less than 3 hours. However, at these high temperatures, the yield of the solid resin obtained may decrease. In order to obtain a fairly rapid rate of reaction with a suitable yield of the desired solid polymer, the copolymerization is ordinarily carried out at a temperature between 60° and 100° C., the optimum temperature being about 80° C. At the temperatures of 60° to 100° C., the copolymerization usually is substantially completed in about 18 to 120 hours, the optimum being from 40 to 60 hours.

The copolymerization may also be carried out in a suitable inert non-aqueous diluent medium. The employment of such a medium for the polymerization may sometimes tend to reduce the rate of the reaction, although, in certain instances, it may facilitate the achievement of a more nearly complete copolymerization of the monomers. The medium either may be a solvent or a non-solvent suspending medium. It is advantageous for the diluent medium that is employed to boil at about the desired polymerization temperature. In this way, the utilization of reflux techniques permits an easy means for the regulation of the reaction temperature. Diethyl ether, diisopropyl ether, petroleum ether, benzene, n-hexane and the like provide beneficial solvent characteristics for employment in the copolymerization. While various low boiling, liquid, non-solvent media may also be employed, it is usually more desirable to utilize solvents. The inert non-aqueous diluent medium may generally be used in a quantity that is approximately equal to the quantity of the monomers being so polymerized.

Different procedures for recovery and purification of the copolymerized product from the reaction mass may be used. Generally, the unreacted monomers and the solvent or other diluent medium (when one has been employed) may be stripped from the reaction mass by vaporization to leave the catalyst-containing copolymeric material. The crude copolymer may be in the form of a very hard brittle solid to a tough rubber-like solid mass having a brownish to blackish coloration, depending upon the particular copolymers, and may be associated with liquid polymers which may have been formed during the reaction. Usually the impure solid copolymer may be dissolved in a suitable solvent, such as hot acetone for some of the copolymers and aromatic solvents for others, which may then be acidified with a hydrohalic or other suitable acid to convert the iron-containing catalyst to a soluble salt form before precipitating the solid polymer by crystallization from the solution at a low temperature, generally about −20° C. or below. Recrystallization may be employed for further purification until a suitable solid copolymeric material is obtained that has a sufficiently high molecular weight to not soften excepting at temperatures that are in excess of about 60° C. For the copolymer which is not soluble in aromatic or oxygenated hydrocarbon solvents, the crude product is washed with the acidified solvents to remove the catalyst and other copolymer which may be soluble in the solvent if any are present.

In some instances some of the solid copolymers, while stable in diffused light, may become brittle upon prolonged exposure to sunlight and ultraviolet light. This tendency may be offset by incorporating in the copolymer a small proportion of a conventional phenolic or aromatic amine antioxidant of the type used for stabilizing rubber. Among the stabilizers which have been used satisfactorily are such phenols as 4,4'-isopropylidene diphenol (Bisphenol A), 4,4'-isopropylidene di-o-cresol (Bisphenol C), 4,4′-isopropylidene di(o-isopropyl phenol) (Bisphenol G), 2,2′-dihydroxy 4,4′-dichlorodiphenylmethane, hydroquinone monobenzyl ether (Agerite alba), 2,6-ditertiary butyl-4-methyl phenol (Ionol), 2,2-methylene bis(4-methyl-6-tertiary butyl phenol) (Antioxidant 2246), N-p-hydroxy phenyl morpholine (Solux), various aryl oxy ketones (Flectol White) and condensation products of beta naphthol with organic bases (Albasan). Also used have been such aromatic amines as sym. di-beta-naphthyl-para-phenylene diamine (Agerite White), phenyl beta naphthyl-amine (Agerite powder and Neozine D), polymerized trimethyl dihydroquinoline (Agerite Resin D), ketone-diamine condensates (Aminox), and condensates of aniline and acetone (Flectol). The antioxidant is usually added in a proportion from 0.5 to 2 percent by weight of the solid polymer. It is most conveniently introduced by mechanically mixing it into the solid resin.

The following examples further illustrate the invention but are not to be construed as limiting it thereto.

*Example I*

To a stainless steel bomb, 20 grams of propylene oxide, 5 grams of methyl methacrylate, and 1 gram of ferric chloride-propylene oxide complex were added. Prior to addition to the bomb, the methyl methacrylate was treated with caustic and water and dried over calcium chloride to remove any inhibitor it may have contained. The ferric chloride-propylene oxide complex was prepared, as described in U.S. Patent No. 2,706,181, by adding a limited amount of propylene oxide very gradually to a body of anhydrous ferric chloride till the vigorous exothermic action ceased. Upon addition of the monomers and the catalyst to the bomb, the bomb was inserted in a protective cage on a revolving paddle in an 80° C. water bath. By being attached to the revolving paddle, the bomb was rotated through 360° and the polymerization mass thus agitated. After about 48 hours the bomb was cooled and opened. A firm, hard, brown solid copolymer with a rubbery texture was obtained which weighed 25.7 grams and represented a conversion of 99 percent. The crude copolymer was cut into small pieces and dissolved in 200 milliliters of warm acetone. To the acetone solution of the copolymer, sufficient amount of concentrated hydrochloric acid was added to convert the iron in the catalyst to a soluble form. Upon addition of the acid, the color of the solution changed from a deep opaque brown to light yellow and was a clear solution. After the addition of the concentrated hydrochloric acid, the solution was cooled to −20° C. and the copolymer which precipitated out was recovered by filtration. The recovered copolymer was washed with acetone and then dried. The purified copolymer was slightly yellow and weighed 6.1 grams which represents a yield of 25 percent based upon the crude copolymer obtained. This copolymer had a softening point in the range of 120° to 190° C. and never completely melted but got rubbery and gummy in nature.

The above run was repeated except that the reaction temperature time was increased to 96 hours. After polymerization, 24.7 grams of the crude copolymer were obtained which upon purification yielded 7.9 grams of the yellowish copolymer. This represented a yield of 32 percent. This copolymer could be readily molded into a strong pliable film.

*Example II*

In a manner similar to that described in Example I propylene oxide was copolymerized with vinylidene chloride.

To the stainless steel bomb, 160 grams of propylene oxide, 40 grams of vinylidene chloride and 8 grams of the ferric chloride-propylene oxide complex were added. This mixture was copolymerized in a manner described in Example I except that a reaction time of 64 hours was used. The crude copolymer obtained weighed 150 grams which represented a 71 percent conversion. Sixty grams of the crude copolymer were purified in a manner similar to that described in Example I. Twenty grams of a slightly brownish purified solid copolymer were obtained which represented a yield of 33 percent. The purified copolymer had a softening point in the range of 70° to 184° C. gradually becoming more plastic with increase in temperature. The copolymer could be readily molded into a strong pliable film.

*Example III*

In a manner similar to that described in Example I propylene oxide was copolymerized with butadiene.

To the stainless steel bomb, 20 grams of propylene oxide, 5 grams of butadiene, and 1 gram of the ferric chloride-propylene oxide complex were added. This mixture was copolymerized in a manner described in Example I except that a reaction time of 115 hours was used. The crude copolymer obtained weighed 24.9 grams which represented a 96 percent conversion. The crude copolymer was placed in hot acetone and concentrated hydrochloric acid added. Upon addition of the hydrochloric acid, 3 grams (dry weight) of a high molecular weight solid separated out from the solution and it had a decomposition temperature of 235° C. Upon chilling the acetone solution, 4.7 grams of additional solid copolymer were obtained. It had a softening point of 70° C. and a tensile strength of 8000 pounds per square inch when molded into a film.

The above run was repeated except that the ratio of propylene oxide and butadiene was changed. To the bomb, 20 grams of butadiene, 5 grams of propylene oxide, and 1 gram of catalyst were added. A tough rubbery solid was obtained in an amount of 20 grams which would not dissolve in hot acetone. It decomposed at 165° C.

*Example IV*

In a manner similar to that described in Example I chloropropylene oxide was copolymerized with methyl methacrylate in proportions of 80 percent by weight of chloropropylene oxide to 20 percent by weight of methyl methacrylate.

To a stainless steel bomb, 20 grams of propylene oxide, 5 grams of methyl methacrylate, and 1 gram of the ferric chloride-propylene oxide complex were added. This mixture was copolymerized in a manner described in Example I except that a reaction time of 72 hours was used. The crude copolymer obtained weighed 21.2 grams which represented an 85 percent conversion. Upon purifying the crude copolymer in a manner similar to that described in Example I, 8.3 grams of solid copolymer were obtained which had a melting range of 115° C. to 125° C. The copolymer so obtained was molded into a film and upon orientation had a tensile strength of 3000 pounds per square inch.

*Example V*

In a manner similar to that described in Example I choloropropylene oxide was copolymerized with vinylidene chloride in proportions of 80 percent by weight of chloropropylene oxide to 20 percent by weight of vinylidene chloride.

To the stainless steel bomb, 20 grams of propylene oxide, 5 grams of vinylidene chloride and 1 gram of the ferric chloride-propylene oxide complex were added. This mixture was copolymerized in a manner described in Example I except that a reaction time of 92 hours was used. The crude copolymer obtained weighed 24.5 grams which represented a 94 percent conversion. It was a hard light brown solid and was non-pliable but could be readily cut with a knife. The crude polymer was cut into small pieces and placed in boiling acetone acidified with hydrochloric acid. Only a part of the copolymer dissolved and 11 grams were obtained that would not dissolve. Upon chilling the solution to −20° C., 1.2 grams of additional copolymer was obtained. The acetone insoluble copolymer and the acetone soluble copolymer were mixed together and molded into a relatively brittle film.

*Example VI*

In a manner similar to that described in Example I chloropropylene oxide was copolymerized with butadiene in proportions of 80 percent by weight of chloropropylene oxide to 20 percent by weight of butadiene.

To the stainless steel bomb, 20 grams of propylene oxide, 5 grams of butadiene, and 1 gram of the ferric chloride-propylene oxide complex were added. This mixture was copolymerized in a manner described in Example I except that a reaction time of 115 hours was used. The crude copolymer obtained weighed 18 grams which represented a 72 percent conversion. Upon purifying the crude copolymer in a manner similar to that described in Example I, 7.6 grams of solid copolymer were obtained. The purified copolymer had a melting point of 103° C. and could be molded into a film.

*Example VII*

In a manner similar to that described in Example I ethylene oxide was copolymerized with the vinylidene chloride in proportions of 55.5 percent by weight of ethylene oxide to 45.5 percent by weight of vinylidene chloride.

To the stainless steel bomb, 15 grams of ethylene oxide, 12 grams of vinylidene chloride, and 1 gram of the ferric chloride-propylene oxide complex were added. This mixture was copolymerized in a manner described in Example I except that a reaction time of 28 hours was used. The crude copolymer obtained weighed 27.8 grams which represented an approximately quantitative conversion. Upon purifying the crude copolymer in a manner similar to that described in Example I, 21.6 grams of solid copolymer were obtained which represented a yield of 81 percent.

What is claimed is:

1. A solid copolymer of from 5 percent by weight to 95 percent by weight of a lower alkylene oxide having from 2 to 4 carbon atoms with from 5 percent by weight to 95 percent by weight methyl methacrylate.

2. A solid copolymer of from 5 percent by weight to 95 percent by weight ethylene oxide with 5 percent by weight to 95 percent by weight methyl methacrylate.

3. A solid copolymer of from 5 percent by weight to 95 percent by weight propylene oxide with from 5 percent by weight to 95 percent by weight methyl methacrylate.

4. A solid copolymer of from 5 percent by weight to 95 percent by weight chloropropylene oxide with from 5 percent by weight to 95 percent by weight methyl methacrylate.

5. A solid copolymer of from 5 percent by weight to 95 percent by weight of a lower alkylene oxide having from 2 to 4 carbon atoms with from 5 percent by weight to 95 percent by weight butadiene.

6. A solid copolymer of from 5 percent by weight to 95 percent by weight ethylene oxide with from 5 percent by weight to 95 percent by weight butadiene.

7. A solid copolymer of from 5 percent by weight to 95 percent by weight propylene oxide with from 5 percent by weight to 95 percent by weight butadiene.

8. A solid copolymer of from 5 percent by weight to 95 percent by weight chloropropylene oxide with from 5 percent by weight to 95 percent by weight butadiene.

9. A process for the preparation of a solid polymeric resin of a lower alkylene oxide having not more than 4 carbon atoms, which comprises mixing from 5 to 95 percent of the lower alkylene oxide with from 5 to 95 percent of a monomeric compound selected from the group consisting of vinylidene chloride, methyl methacrylate, butadiene, and mixtures thereof in the presence of from 1 to 6 weight percent, based upon the weight of the monomers, of a ferric chloride-propylene oxide complex catalyst containing approximately 2 to 3 moles of combined propylene oxide per mole of combined ferric chloride, heating the resulting mixture to a temperature of 30° to 150° C. for a period of time sufficient to copolymerize substantially all of the propylene oxide and the monomeric compound, and separating the solid copolymer from the copolymerized mixture.

10. A process according to claim 9 wherein the resulting mixture is heated to a temperature of 60° to 100° C. for a period of time of from 3 to 200 hours.

11. A process according to claim 10 wherein the resulting mixture is heated for a period of time of from 18 to 120 hours.

12. A process for the preparation of a solid polymeric resin of propylene oxide and methyl methacrylate, which comprises mixing from 80 to 90 weight percent of propylene oxide with from 10 to 20 weight percent of methyl methacrylate in the presence of 4 weight percent, based upon the weight of the monomers, of a ferric chloride-propylene oxide complex catalyst containing approximately 2 to 3 moles of combined propylene oxide per mole of combined ferric chloride, heating the resulting mixture to a temperature of 80° C. for from 40 to 60 hours, and separating the solid copolymer from the copolymerized mixture.

13. A process according to claim 11 wherein the alkylene oxide is propylene oxide and the monomeric compound is methyl methacrylate.

References Cited in the file of this patent

UNITED STATES PATENTS

| | | |
|---|---|---|
| 1,988,529 | Werntz | Jan. 22, 1935 |
| 2,179,040 | Heuer | Nov. 7, 1939 |
| 2,516,960 | Coffman | Aug. 1, 1950 |
| 2,556,048 | Stanton et al. | June 5, 1951 |
| 2,706,181 | Pruitt et al. | Apr. 12, 1955 |
| 2,765,296 | Strain | Oct. 2, 1956 |
| 3,004,961 | Hauptschein | Oct. 17, 1961 |

OTHER REFERENCES

Mark: Scientific American, vol. 197, No. 3, pp. 81–83, September 1957.

Debye: Scientific American, vol. 197, No. 3, pp. 90–97, September 1957.

Arbuzov et al.: Chemical Abstracts, vol. 39, pp. 4838–9, 1945.

Flory: Principles of Polymer Chemistry, published by Cornell University Press, pp. 60 and 61, 1953.